(12) United States Patent
Foote et al.

(10) Patent No.: US 7,303,297 B1
(45) Date of Patent: Dec. 4, 2007

(54) VEHICULAR MIRROR WITH IMPROVED BEARING FIT

(75) Inventors: Keith D. Foote, Kentwood, MI (US); James A. Ruse, Allegan, MI (US); Benjamin D. Newton, Saranac, MI (US); Kenneth C. Peterson, Comstock Park, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 0 days.

(21) Appl. No.: 10/708,388

(22) Filed: Feb. 27, 2004

Related U.S. Application Data

(60) Provisional application No. 60/319,979, filed on Feb. 27, 2003.

(51) Int. Cl.
*G02B 7/182* (2006.01)
(52) U.S. Cl. ....................................... 359/879
(58) Field of Classification Search ......... 359/871–879
See application file for complete search history.

(56) References Cited

U.S. PATENT DOCUMENTS

| | | | |
|---|---|---|---|
| 4,558,930 A | 12/1985 | Deedreek | |
| 4,626,084 A * | 12/1986 | Kumai | ........................ 359/841 |
| 4,657,362 A | 4/1987 | Suzuki | |
| 4,789,232 A * | 12/1988 | Urbanek | ..................... 248/549 |
| 5,315,442 A | 5/1994 | Sato et al. | |
| 5,384,660 A | 1/1995 | Oishi | |
| 5,432,641 A | 7/1995 | Mochizuki | |
| 5,467,222 A | 11/1995 | Oishi | |
| 5,483,385 A | 1/1996 | Boddy | |
| 5,514,940 A | 5/1996 | Okamoto | |
| 5,594,590 A | 1/1997 | Ishiyama | |
| 5,600,467 A * | 2/1997 | Fee | ........................... 359/875 |
| 5,636,071 A | 6/1997 | Mochizuki et al. | |
| 5,684,646 A | 11/1997 | Boddy | |
| 5,703,732 A | 12/1997 | Boddy et al. | |
| 5,734,517 A | 3/1998 | Kang | |
| 5,781,354 A | 7/1998 | Sakata | |
| 5,823,054 A | 10/1998 | Brouwer | |
| 5,864,438 A | 1/1999 | Pace | |
| 5,909,326 A * | 6/1999 | Leonberger | ................. 359/841 |
| 5,984,483 A * | 11/1999 | Mazurek et al. | ............ 359/872 |
| 6,022,113 A | 2/2000 | Stolpe et al. | |
| 6,116,743 A | 9/2000 | Hoek | |
| 6,130,514 A | 10/2000 | Oesterholt et al. | |
| 6,133,704 A | 10/2000 | Yoshida et al. | |
| 6,179,428 B1 * | 1/2001 | Krass | ......................... 359/841 |
| 6,213,609 B1 | 4/2001 | Foote et al. | |
| 6,276,808 B1 | 8/2001 | Foote et al. | |
| 6,322,221 B1 | 11/2001 | van de Loo | |
| 6,390,630 B1 | 5/2002 | Ochs | |
| 6,394,616 B1 | 5/2002 | Foote et al. | |
| 6,416,192 B2 | 7/2002 | Horne et al. | |
| 6,439,730 B1 | 8/2002 | Foote et al. | |
| 6,447,129 B2 | 9/2002 | Hayashi et al. | |
| 6,592,231 B2 | 7/2003 | Horne et al. | |

* cited by examiner

*Primary Examiner*—Euncha P. Cherry
(74) *Attorney, Agent, or Firm*—McGarry Bair PC

(57) ABSTRACT

An extendable, foldable rearview mirror assembly comprises a ball bearing assembly for facilitating the extension of a reflective element assembly relative to a cantilevered extension arm while minimizing unwanted movement of the reflective element assembly. The rearview mirror assembly also comprises a roller bearing assembly for facilitating the pivotal movement of the extension arm relative to a pivot base frame supporting the extension arm while minimizing unwanted movement of the extension arm. A pin connection pivotably attaches the extension arm to the base frame, thereby strengthening the connection between the two parts while minimizing unwanted movement of the extension arm.

14 Claims, 14 Drawing Sheets

VEHICULAR MIRROR WITH IMPROVED BEARING FIT

CROSS-REFERENCE TO RELATED APPLICATION

This application claims the benefit of U.S. provisional application Ser. No. 60/319,979, filed Feb. 27, 2003, which is incorporated herein in its entirety.

FIELD OF THE INVENTION

The invention relates to an external vehicle mirror and, more particularly, to an external vehicle mirror having powered folding and powered extension functionality. In another aspect, the invention relates to an extendable vehicle mirror comprising a recirculating ball bearing assembly enabling both a close fit and slidability between a mirror support arm and an extendable mirror assembly. In another aspect, the invention relates to a folding vehicle mirror comprising a pivot assembly incorporating roller bearings enabling a close fit and pivotability between a mirror support arm and a pivot support base. In another aspect, the invention relates to a folding vehicle mirror comprising a pivot assembly incorporating parallel flanges slidably communicating with upper and lower opposed surfaces of a mirror support arm which is pivotably pinned to one of the flanges.

DESCRIPTION OF THE RELATED ART

External mirrors are ubiquitous for contemporary vehicles and have long been used to aid the driver in operating the vehicle, especially in improving the rearward view of the driver. Over time, more and more functionality has been incorporated into the external mirrors. For example, it is common to pivot or fold the external mirror against the vehicle body to prevent the jarring of the mirror when the vehicle is not operated. The mirror folding function can incorporate a power assist, such as that disclosed in U.S. Pat. No. 5,684,646. External mirrors are also extendable away from the vehicle to increase the field of view, which is useful when towing a trailer. Mirrors incorporating both the powered fold and powered extension functionality are well-known. An example of such a mirror is disclosed in U.S. Pat. No. 6,213,609, assigned to the assignee of the current application, which is incorporated by reference.

The extension assembly typically comprises a support arm attached to the vehicle in cantilevered fashion which slidably communicates with a mating receptacle in a reflective element assembly. The support arm and the mating receptacle are typically provided with cooperative bearing surfaces suitable for the slidable movement between the support arm and the reflective element assembly. An extension actuator in the support arm drives the reflective element assembly along the support arm to selectively extend and retract the reflective element assembly.

In order to provide the operator with an adequate rearward view, particularly when the vehicle is used to tow a trailer, the rearview mirrors are typically large, relatively heavy assemblies. The large mirror size also contributes to large wind loads imposed on the reflective element assembly when the vehicle is in use. To facilitate the extension of the reflective element assembly along the support arm, the tolerances between the bearing surfaces must not be so close as to impede their slidable movement. Otherwise, a more robust actuator must be used to overcome the friction between the bearing surfaces, thereby adding weight to the mirror assembly, increasing cost, increasing power consumption, and reducing durability. On the other hand, greater tolerances between bearing surfaces can lead to unacceptable vibration of the mirror assembly, and the imposition of excessive forces on the support arm, which can contribute to premature failure of mirror components and adversely impact the performance of the extension mechanism. This is particularly significant with large mirrors supported on a cantilevered support arm.

If the mirror is also foldable, the pivot mechanism must also be capable of easily pivoting the support arm while providing adequate structural support to the cantilevered support arm and the weight of the supported reflective element assembly. Overly close tolerances between rotating bearing surfaces, while enhancing the structural strength of the pivot mechanism, can impede the relative movement of the pivot arm about its support base. However, greater tolerances can lead to vibration of the mirror assembly, and the imposition of excessive forces on the component parts, which can also contribute to premature failure of mirror components and adversely impact the performance of the folding mechanism.

SUMMARY OF THE INVENTION

In one aspect, the invention relates to a vehicular rearview mirror assembly, comprising: a base assembly comprising a base frame for mounting the rearview mirror assembly to a vehicle; a reflective element mounted to the base frame for providing an occupant of the vehicle with a rearward view; and a low friction bearing interposed between the base frame and the reflective element for facilitating movement of the reflective element relative to the base frame.

In another aspect, the invention relates to a vehicular rearview mirror assembly, comprising: a reflective element mounted to a mounting frame for providing an occupant of the vehicle with a rearward view; an extension arm mounted to a vehicle and moveably attached to the reflective element assembly; and a low friction bearing interposed between the mounting frame and the extension arm for facilitating movement of the reflective element relative to the extension arm.

In a further aspect, the invention relates to a vehicular rearview mirror assembly, comprising: a base assembly comprising a base frame for mounting the rearview mirror assembly to a vehicle; at least one support arm for supporting a reflective element and moveably connected to the base frame for selectively folding the reflective element against the vehicle and extending the reflective element away from the vehicle; and a low friction bearing interposed between the base frame and the at least one support arm for facilitating movement of the reflective element relative to the vehicle.

In yet another aspect, the invention relates to a vehicular rearview mirror assembly, comprising: a base assembly comprising a base frame for mounting the rearview mirror assembly to a vehicle; at least one support arm for supporting a reflective element and pivotably connected to the base frame for selectively folding the reflective element against the vehicle and extending the reflective element away from the vehicle; and a pair of parallel spaced-apart flanges, wherein the at least one support arm is interposed between the parallel flanges to form the pivot connection.

Various embodiments of the invention are also contemplated. For example, the low friction bearing can comprise a ball bearing. The low friction bearing can comprise a roller bearing. The reflective element can further comprise a mounting frame attached to the reflective element, and the base assembly can further comprise at least one arm moveably connected to the mounting frame, and the low friction bearing is interposed between the at least one arm and the mounting frame for facilitating the movement of the mounting frame relative to the base assembly. The base assembly can further comprise at least one arm moveably connected to the base frame and the low friction bearing is interposed between the at least one arm and the base frame for facilitating the movement of the at least one arm relative to the base frame.

The moveable connection can comprise a pivot connection, the base frame can comprise parallel spaced-apart flanges, and the at least one arm is interposed between the parallel flanges to form the pivot connection. The low friction bearing can be interposed between the at least one arm and the parallel flanges.

DESCRIPTION OF THE PREFERRED EMBODIMENT

Figure 1:
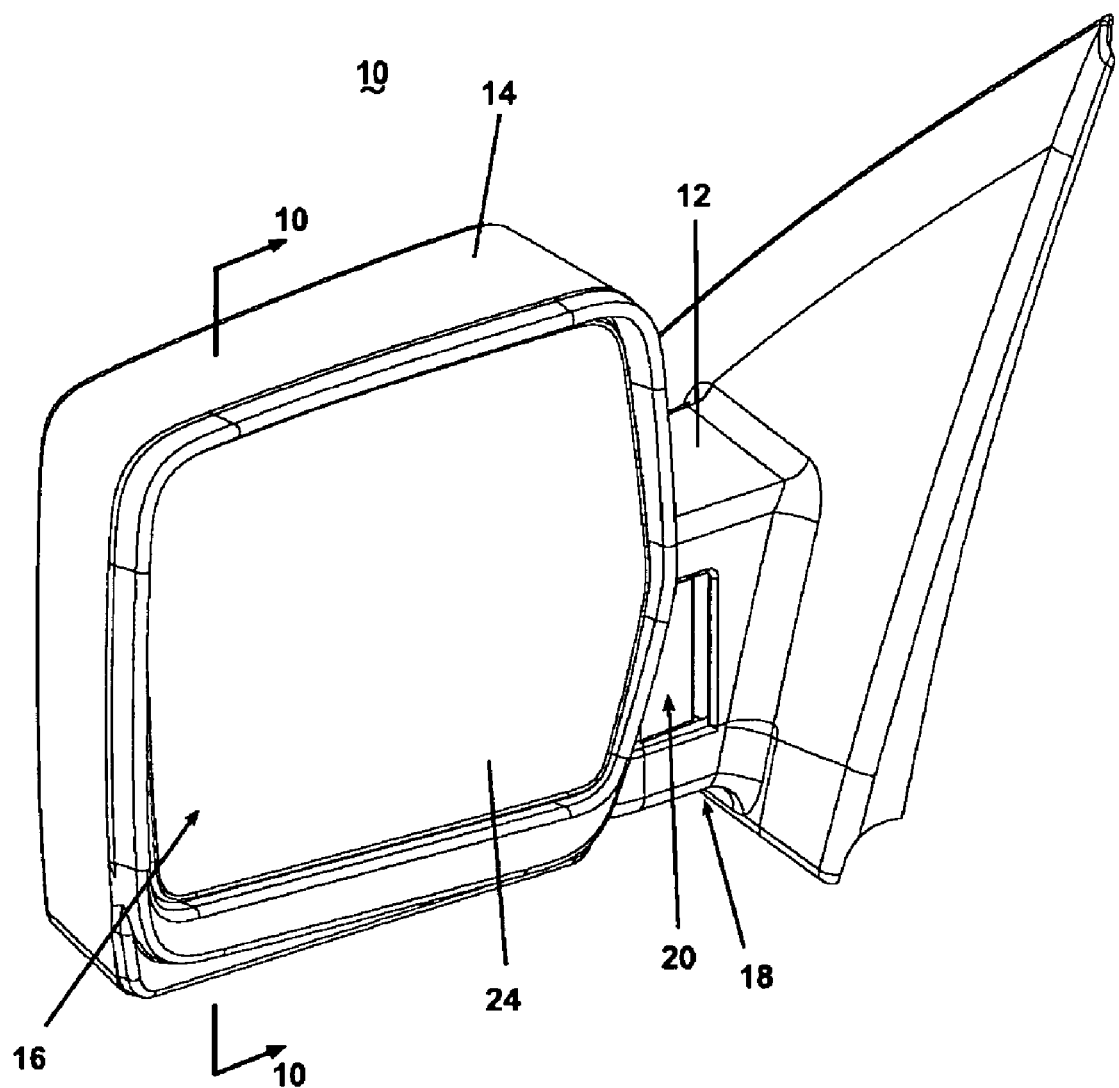
FIG. 1 is a front perspective view of a mirror assembly according to the invention.
Figure 2:
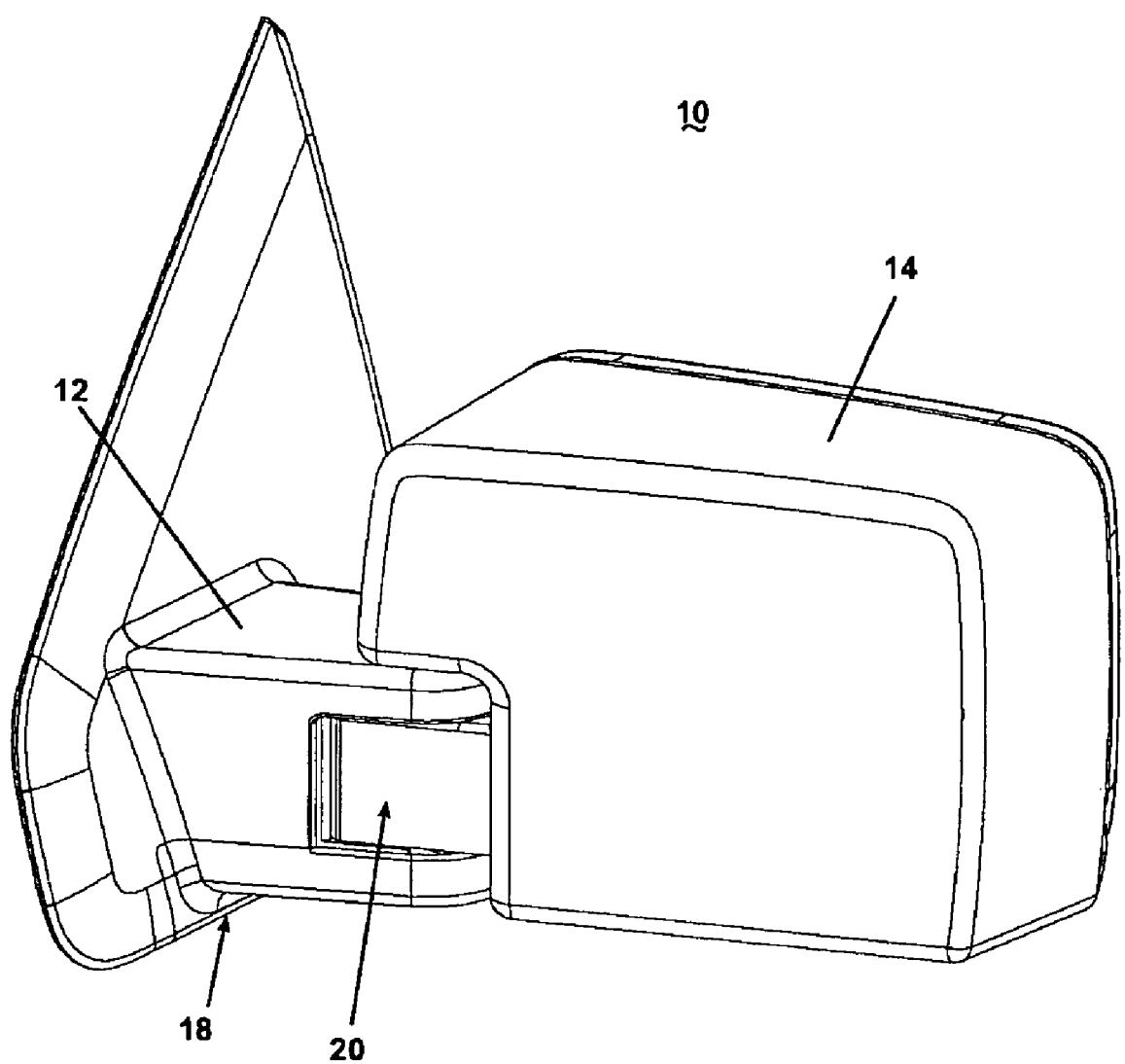
FIG. 2 is a rear perspective view of the mirror assembly shown in FIG. 1.

Referring now to the figures, and particularly to FIGS. 1-4, a rearview mirror assembly 10 comprises a base housing 12 enclosing a base assembly 18 and a mirror housing 14 enclosing a reflective element assembly 16 comprising a reflective element 24. The rearview mirror assembly 10 is attached through the base assembly 18 to the exterior of a motor vehicle (not shown) in a well-known manner for providing an operator of the motor vehicle with a rearward view. The reflective element assembly 16 is attached to the base assembly 18 through a pivot assembly 20 for selectively folding the mirror against the motor vehicle.

Figure 3:
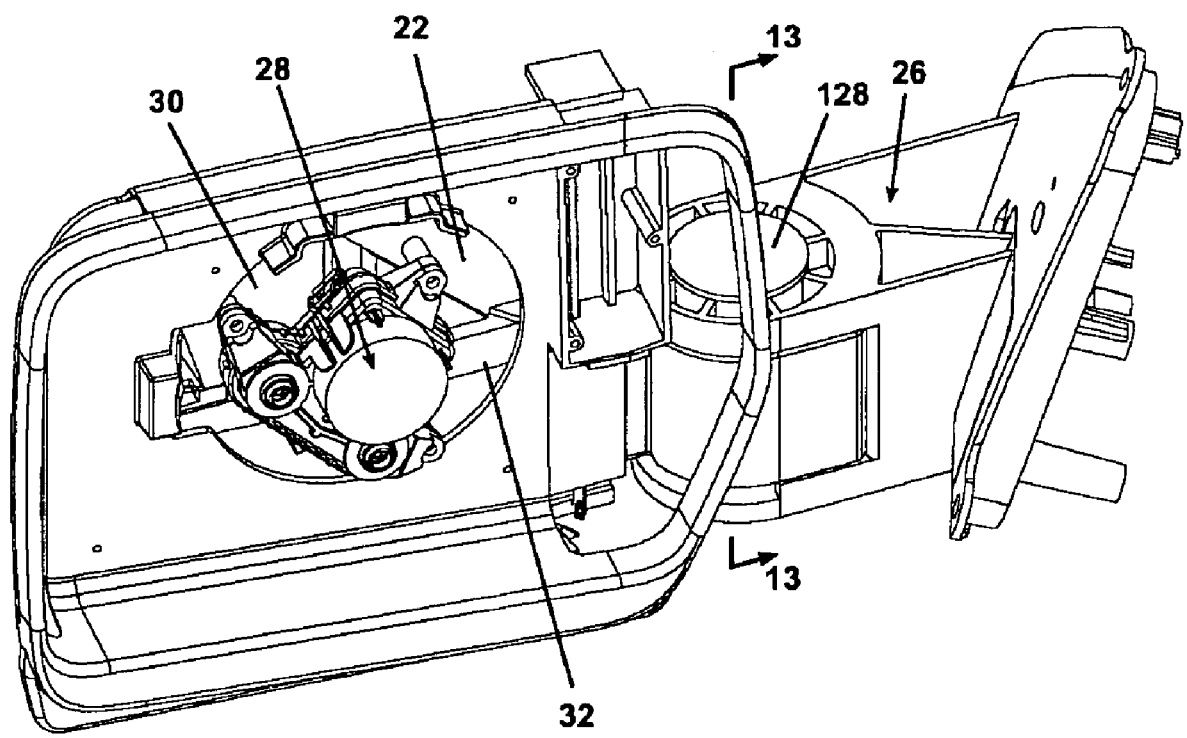
FIG. 3 is a front perspective view of the interior components of the mirror assembly shown in FIG. 1.

As shown in FIG. 3, the base assembly 18 comprises a base frame 26 which is rigidly attached to the side of the motor vehicle. The reflective element assembly 16 comprises a mounting frame 22 for supporting elements of the rearview mirror assembly 10 such as a tilt actuator assembly 28 for adjusting the vertical and horizontal inclination of the reflective element 24, the mirror housing 14, external lights, such as puddle lights (not shown), and associated electrical wiring (not shown). The tilt actuator assembly 28, the reflective element 24, and the mirror housing 12, 14 are well-known and will not be described herein except where necessary for an adequate understanding of the invention.

Figure 4:
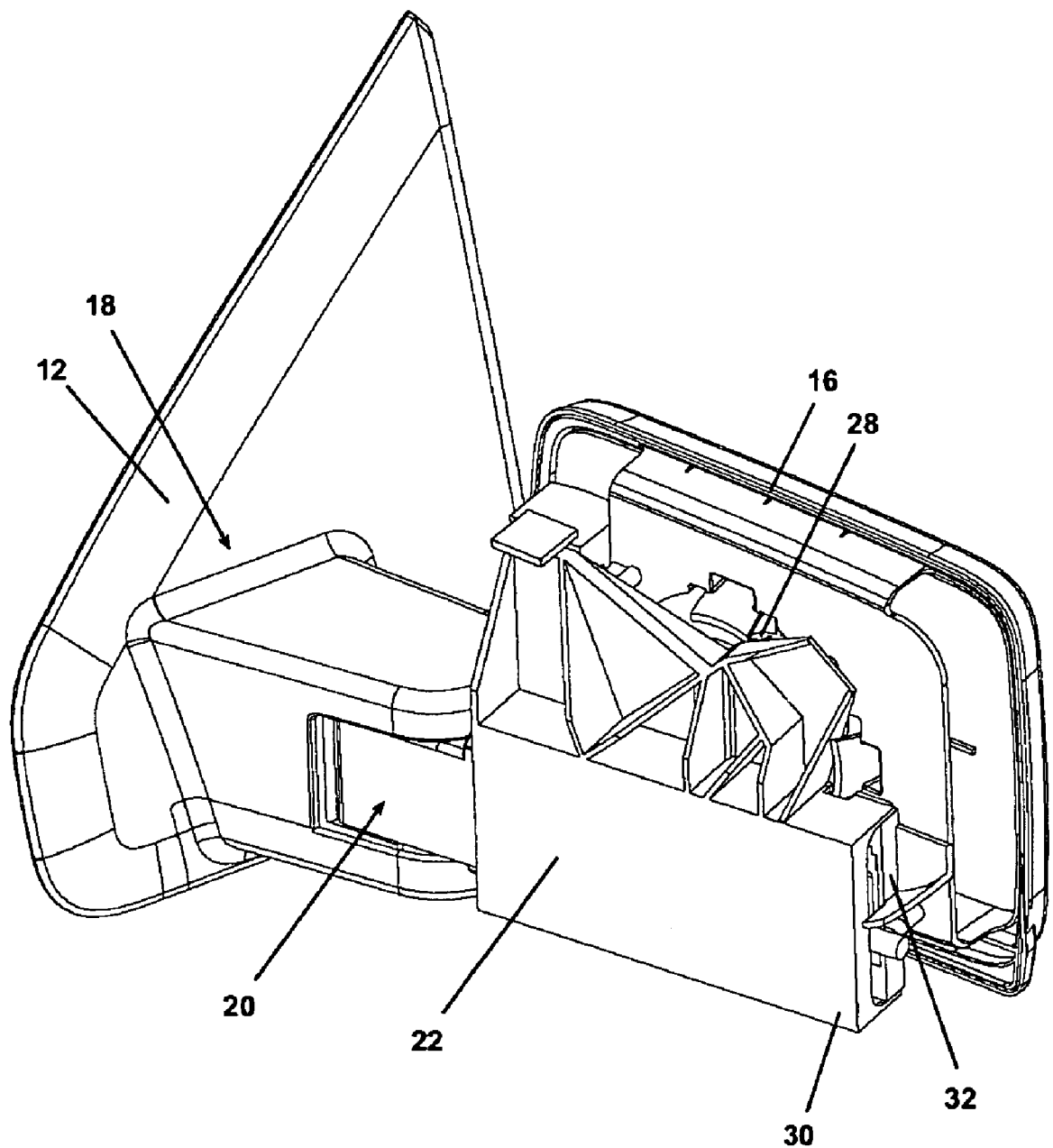
FIG. 4 is a rear perspective view of the interior components of the mirror assembly shown in FIG. 2.
Figure 9:
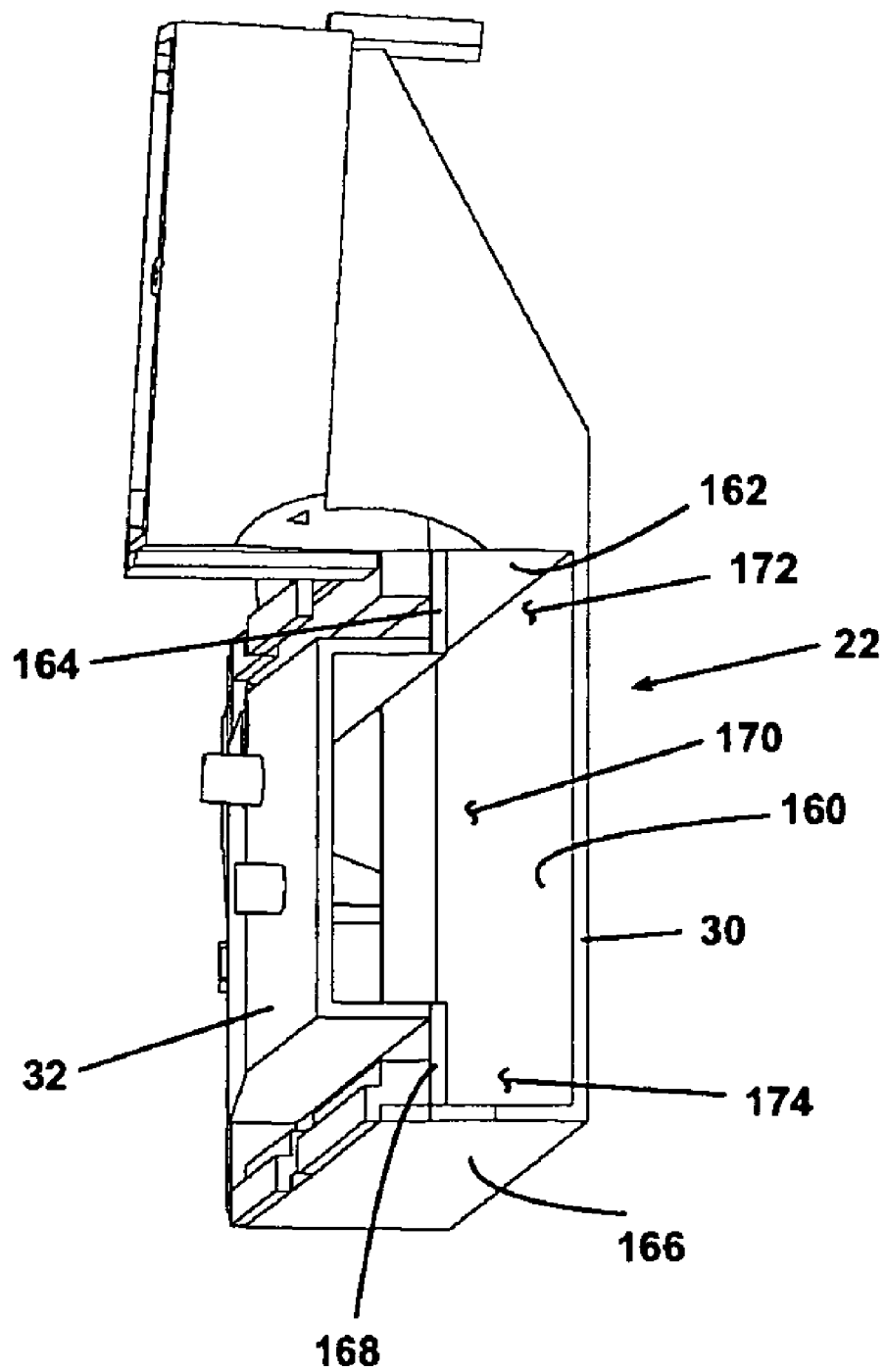
FIG. 9 is a perspective view of a support frame adapted to translate along the support arm shown in FIG. 8.
Figure 10:
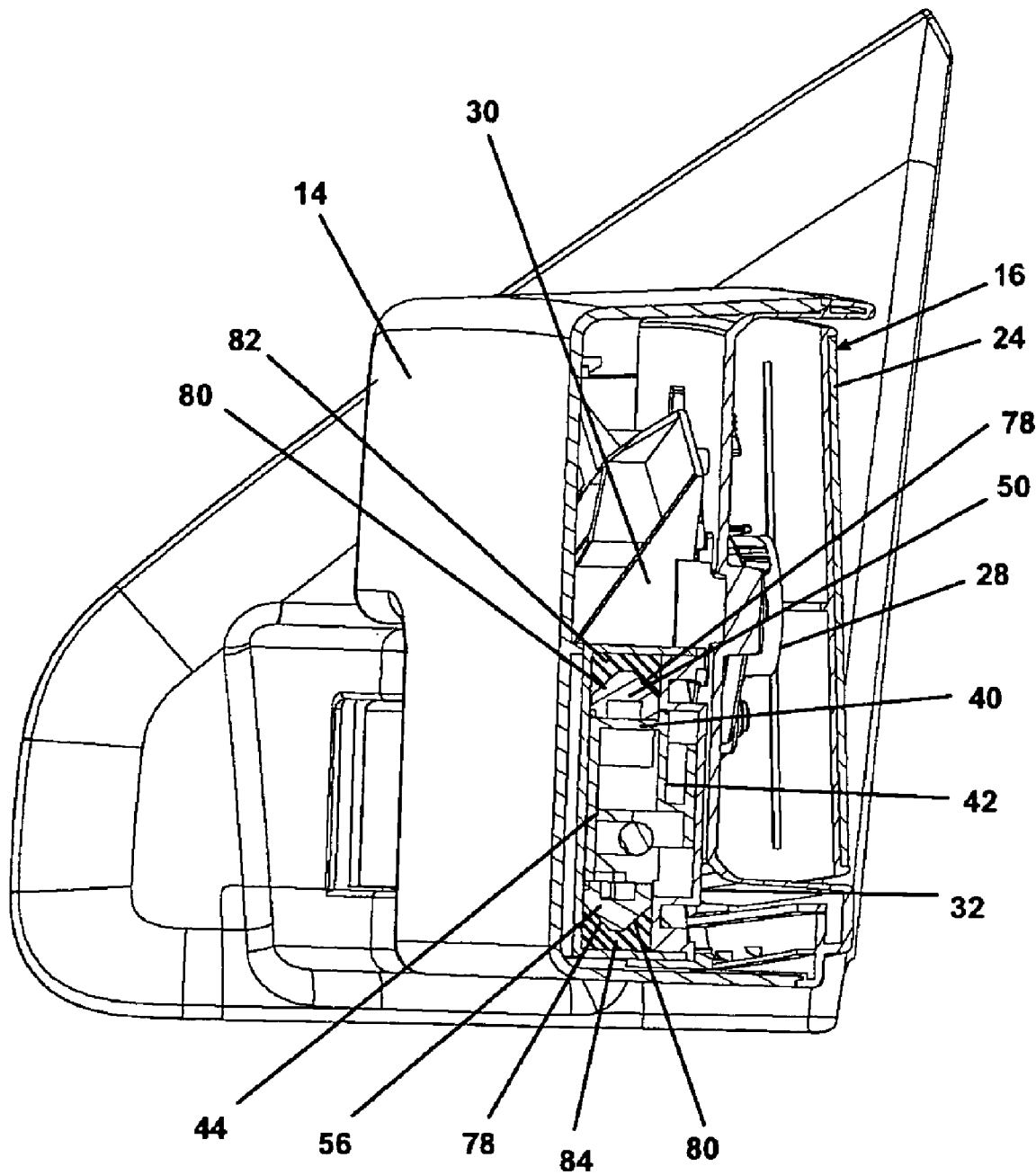
FIG. 10 is a sectional view taken along line 10-10 of FIG. 1.
Figure 11:
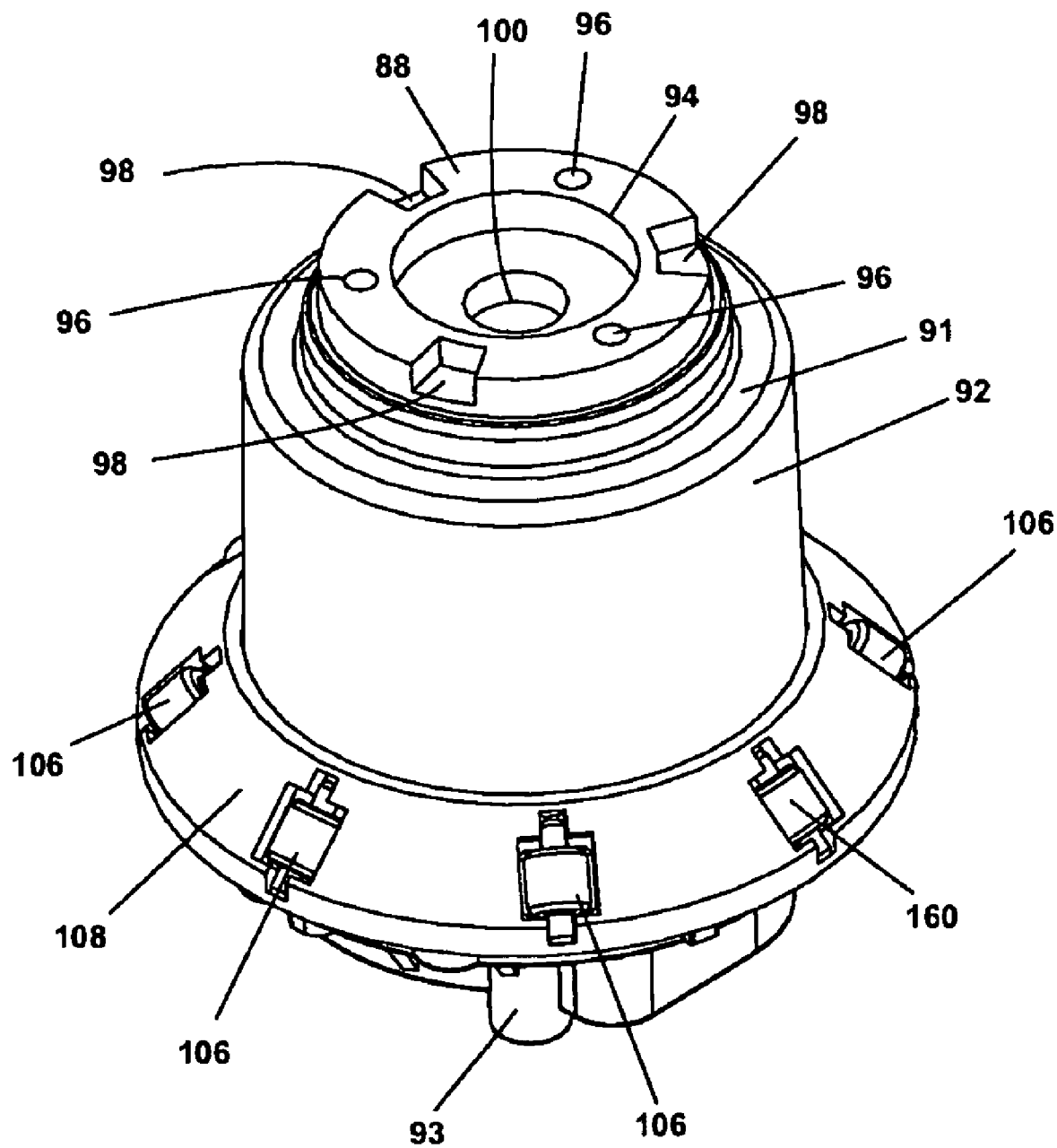
FIG. 11 is a perspective view of a portion of a pivot assembly comprising a pivot actuator and a ring race according to the invention.
Figure 12:
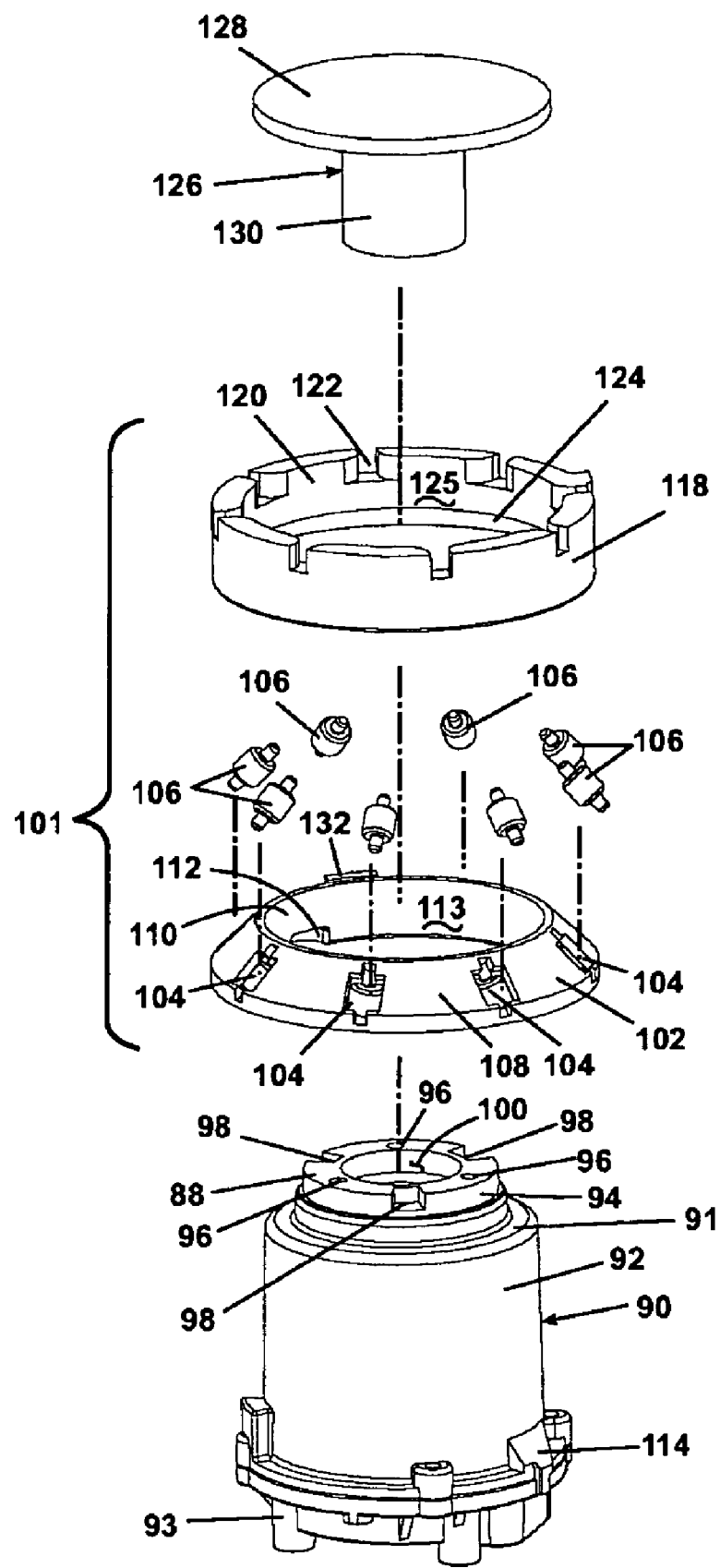
FIG. 12 is an exploded view of a portion of a pivot assembly comprising a pivot actuator, a ring race, a ring block, and a pivot pin.

As shown in FIGS. 4 and 9, the mounting frame 22 is an elongated, irregularly-shaped member comprising a rear frame element 30 and a front frame element 32. The rear frame element 30 is a somewhat rectilinear piece comprising a rear wall 160 terminating in an upper wall 162 and a lower wall 166 in parallel, spaced-apart juxtaposition extending orthogonally from the rear wall 160, an upper front wall 164 and a lower front wall 168 in coplanar, spaced-apart juxtaposition extending orthogonally inwardly from the upper wall 162 and the lower wall 166, respectively and parallel to the rear wall 160. The upper portion of the rear wall 168 and the upper front wall 164 define a rectilinear upper bearing block chamber 172. The lower portion of the rear wall 168 and the lower front wall 168 define a rectilinear lower bearing block chamber 174.

The front frame element 32 is a somewhat rectilinear piece adapted for mating communication with the rear frame element 30. When assembled, the front frame element 32 and the rear frame element 30 together define an elongated, rectilinear arm chamber 170. Preferably, the front frame element 32 and the rear frame element 30 are fabricated of a structural plastic having sufficient strength and rigidity for the purposes described herein.

Referring now to FIGS. 5-8, an extension arm 34 is an elongated, generally rectilinear member having a cantilever end 36 and a pivot end 38. Intermediate the cantilever end 36 and the pivot end 38 is a center portion comprising a top wall 40, and a front sidewall 42 and a rear sidewall 44 in parallel, spaced-apart juxtaposition depending orthogonally from the top wall 40. An elongated rib 46 having a generally triangular-shaped cross-section extends upwardly from the top wall 40 parallel to the longitudinal axis of the extension arm 34. Intermediate the rib 46 and the cantilever end 36 is a gap 48 extending through the top wall 40.

A first arcuate wall 64 extends from the front sidewall 42 and transitions to a second arcuate wall 66 at the pivot end 38. The arcuate walls 64, 66 enclose an annular wall 68 depending orthogonally from the top wall 40 and, with the top wall 40, defining a cylindrical pivot actuator chamber 76. Extending radially outwardly from the arcuate wall 68 are a plurality of regularly-spaced radial ribs 74. The portion of the top wall 40 circumscribing the annular wall 68 comprises a plurality of mounting apertures 72 therethrough and a plurality of interspaced bosses 86 surrounding a pin aperture 62. Preferably, the extension arm 34 is fabricated of a structural plastic having sufficient strength and rigidity for the purposes described herein.

Figure 5:
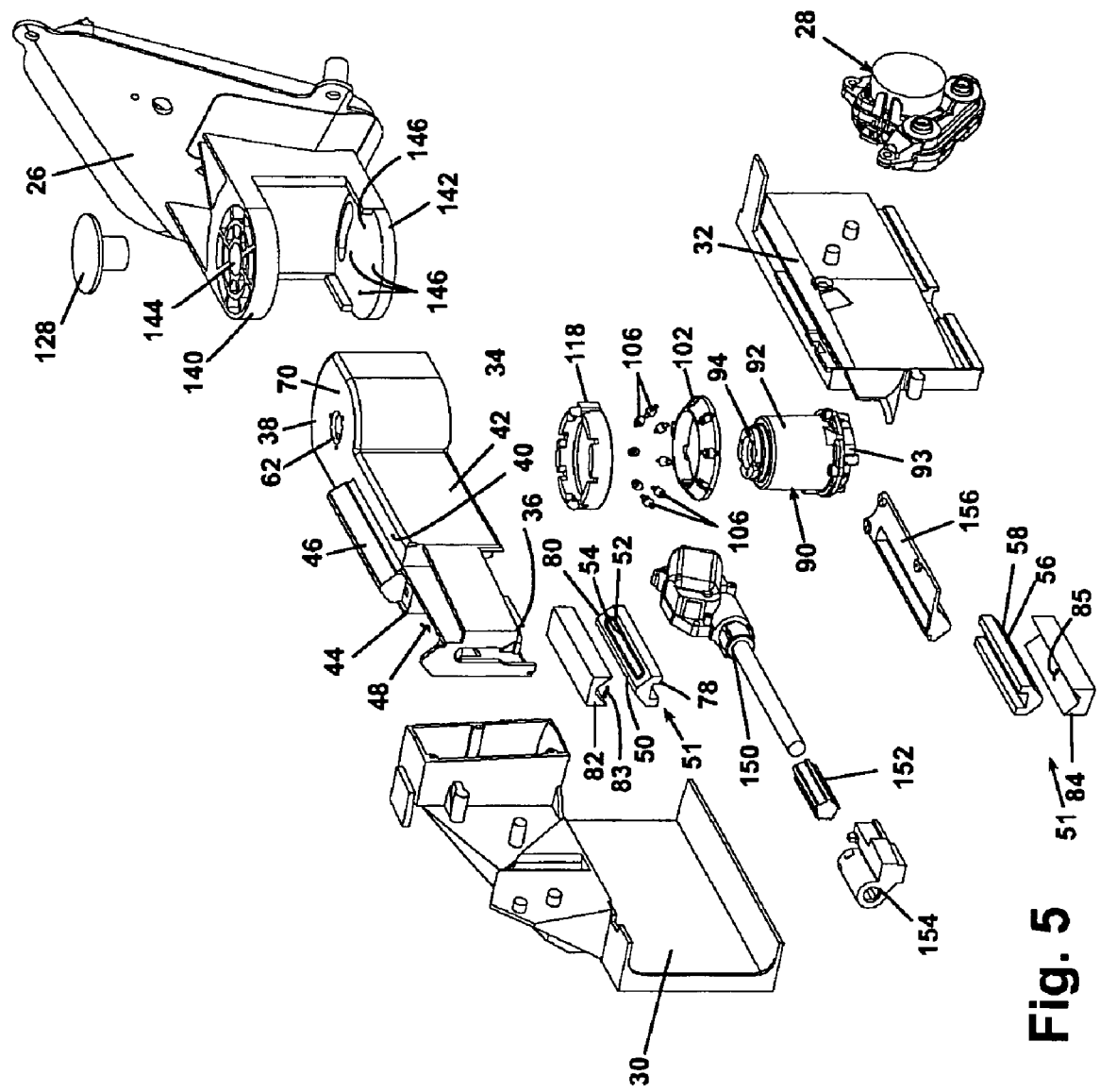
FIG. 5 is an exploded view of the interior components of the mirror assembly shown in FIG. 3.
Figure 6:
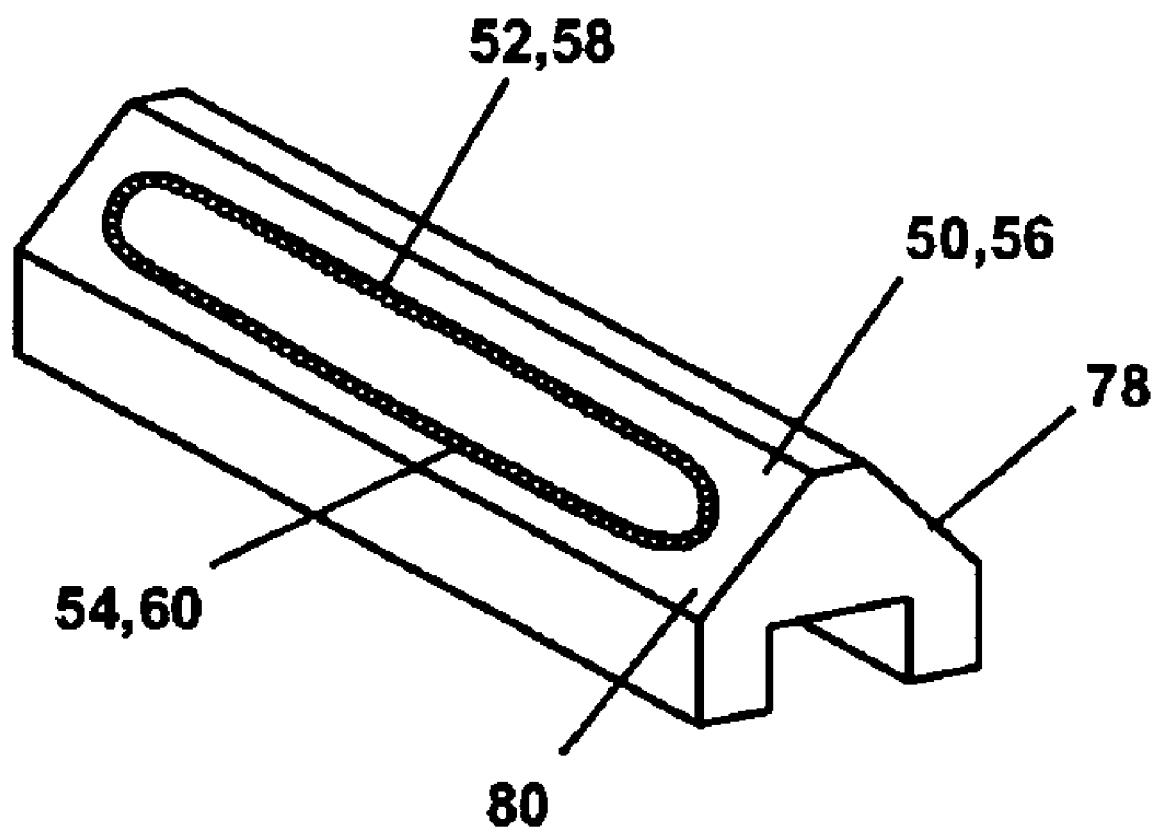
FIG. 6 is a close-up view of a ball bearing race comprising a portion of a mirror extension assembly according to the invention.
Figure 7:
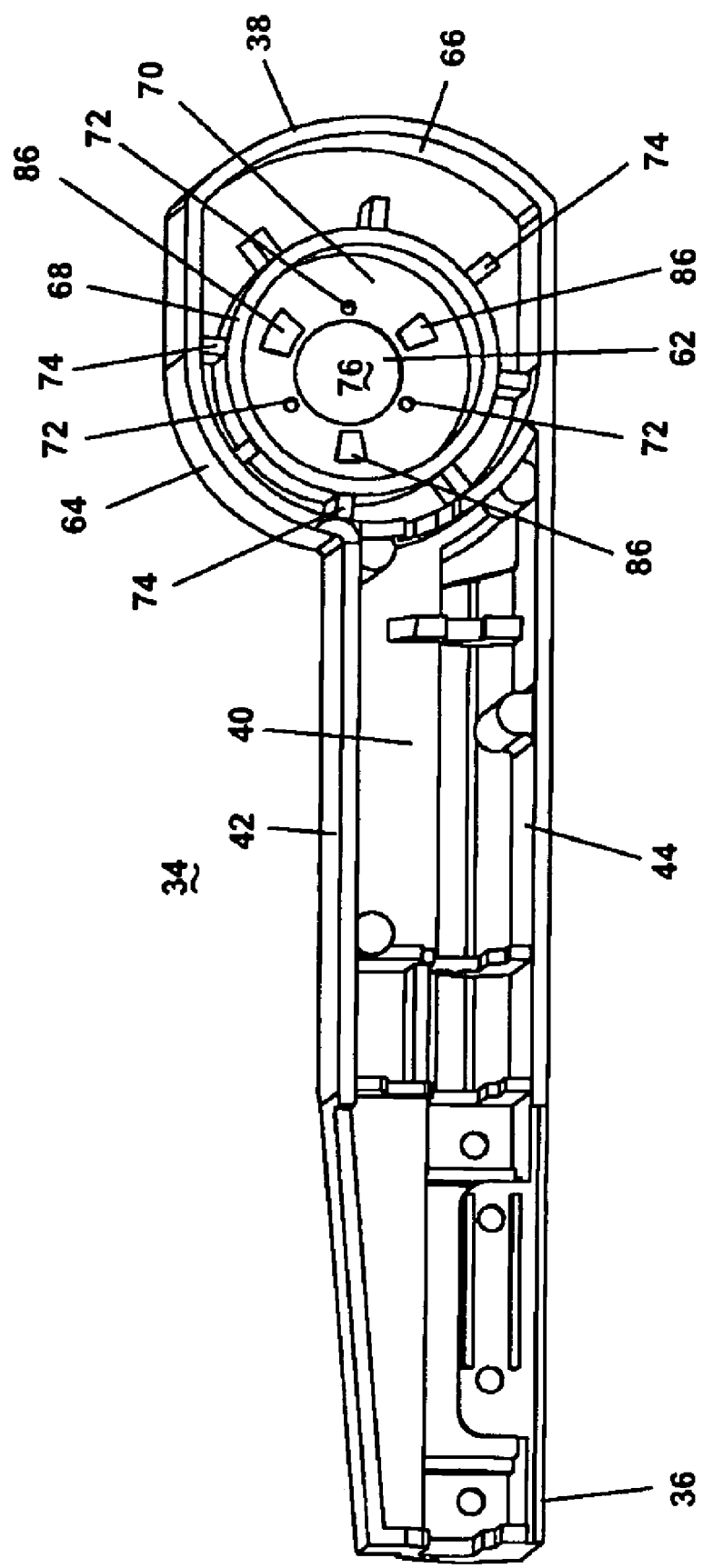
FIG. 7 is a perspective view of the underside of a support arm comprising a portion of a mirror extension assembly according to the invention.
Figure 8:
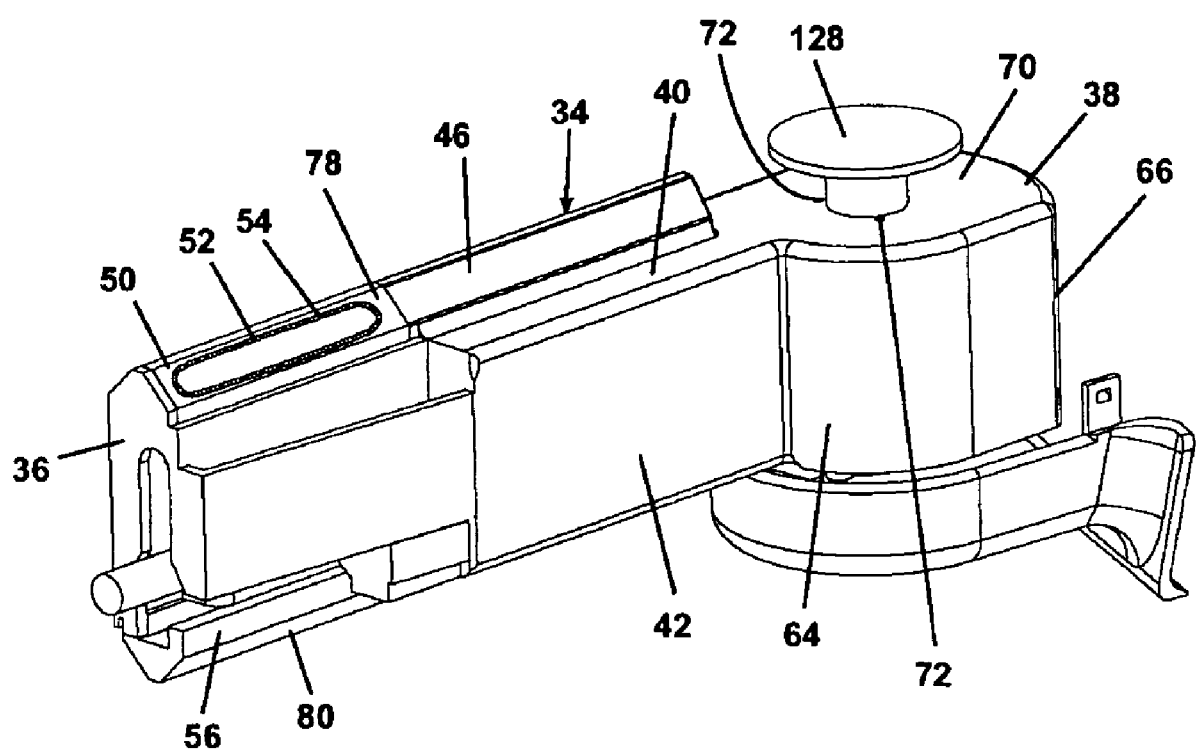
FIG. 8 is a perspective view of a portion of a mirror extension assembly comprising the ball bearing race shown in FIG. 6 and the support arm shown in FIG. 7.

Referring specifically to FIGS. 5 and 6, a frictionless bearing assembly is illustrated as comprising an upper ball bearing assembly 51, which comprises an upper ball bearing race 50 and an upper bearing block 82. The upper ball bearing race 50 comprises an elongated, rectilinear member having a truncated triangular cross-section, and a first inclined face 78 and a second inclined face 80 preferably oriented at 90° to one another. An elongated, oval-shaped upper ball bearing raceway 52 is cut into each inclined face 78, 80 and adapted to receive a plurality of recirculating ball bearings 54. A lower ball bearing assembly 57 comprises lower ball bearing race 56 and a lower bearing block 84. The lower ball bearing race 56 comprises an elongated, rectilinear member identical to the upper ball bearing race 50, and a lower ball bearing raceway 58 containing a plurality of recirculating ball bearings 60. The upper ball bearing race 50 is fixedly inserted into the gap 48 in cooperative, collinear alignment with the rib 46, as shown in FIG. 8. The lower ball bearing race 56 is similarly fixedly attached to a lower rib mount along the underside of the extension arm 34, as shown in FIG. 8.

The upper bearing block 82 is an elongated, rectilinear member defining a truncated triangular channel 83 adapted for cooperative, slidable communication with the upper ball bearing race 50. The lower bearing block 84 is an elongated, rectilinear member identical to the upper bearing block 82 defining a truncated triangular channel 85 adapted for cooperative, slidable communication with the lower ball bearing race 56. The upper bearing block 82 is further adapted to be received in the upper bearing block chamber 172, and the lower bearing block 84 is adapted to be received in the lower bearing block chamber 174. The bearing blocks 82, 84 are fixedly retained in the bearing block chambers 172, 174 through a suitable attachment such as a snap-fit attachment, an adhesive, pins, or threaded fasteners. The upper ball bearing race 50, the lower ball bearing race 56, the upper bearing block 82, and the lower bearing block 84 are fabricated of a material having suitable strength and abrasion resistance for the purposes described herein, such as aluminum or a high strength plastic.

The extension arm 34 and the mounting frame 22 are adapted so that the cantilever end 36 can be inserted into the arm chamber 170 with the upper ball bearing race 50 in slidable communication with the upper bearing block channel 83 and the lower ball bearing race 56 in slidable communication with the lower bearing block channel 85. A conventional extension actuator 150, shown in FIG. 5, is attached to the extension arm 34 in a conventional manner. An extension nut housing 154 containing an extension nut 152 adapted for threaded communication with the extension actuator 150 is attached to the mounting frame 22 so that activation of the extension actuator 150 will drive the mounting frame 22 in linear, arcuate, or other selected ranges of motion relative to the extension arm 34, with the ball bearing races 50, 56 traveling along the bearing block channels 83, 85, respectively.

While the frictionless bearing assembly has been illustrated in FIGS. 5 and 6 as comprising a ball bearing assembly, it will be evident to a person of ordinary skill in the art that alternate bearings, such as a roller bearing assembly, can also be utilized.

Figure 13:
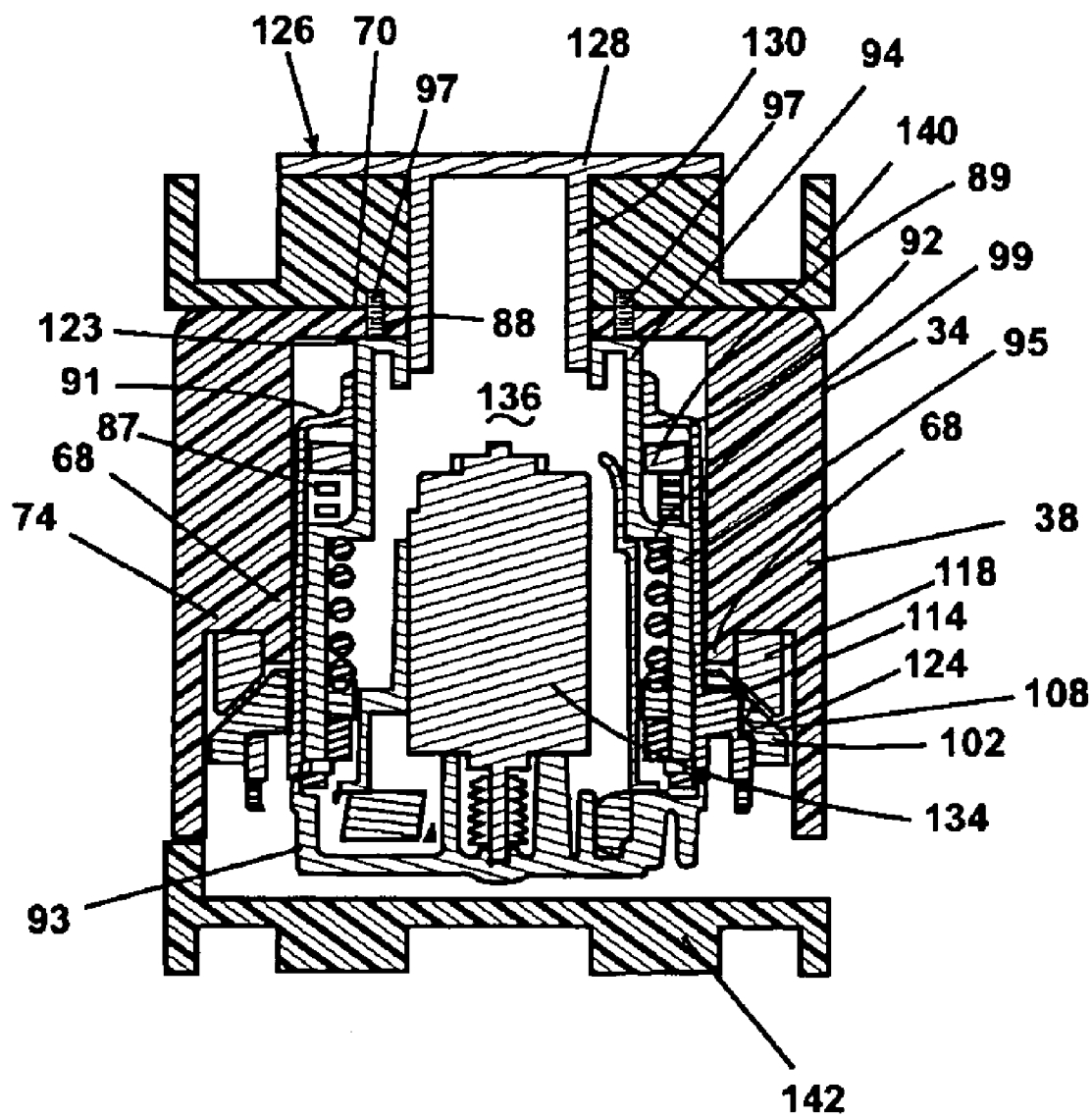
FIG. 13 is a sectional view taken along line 13-13 of FIG. 3.
Figure 14:
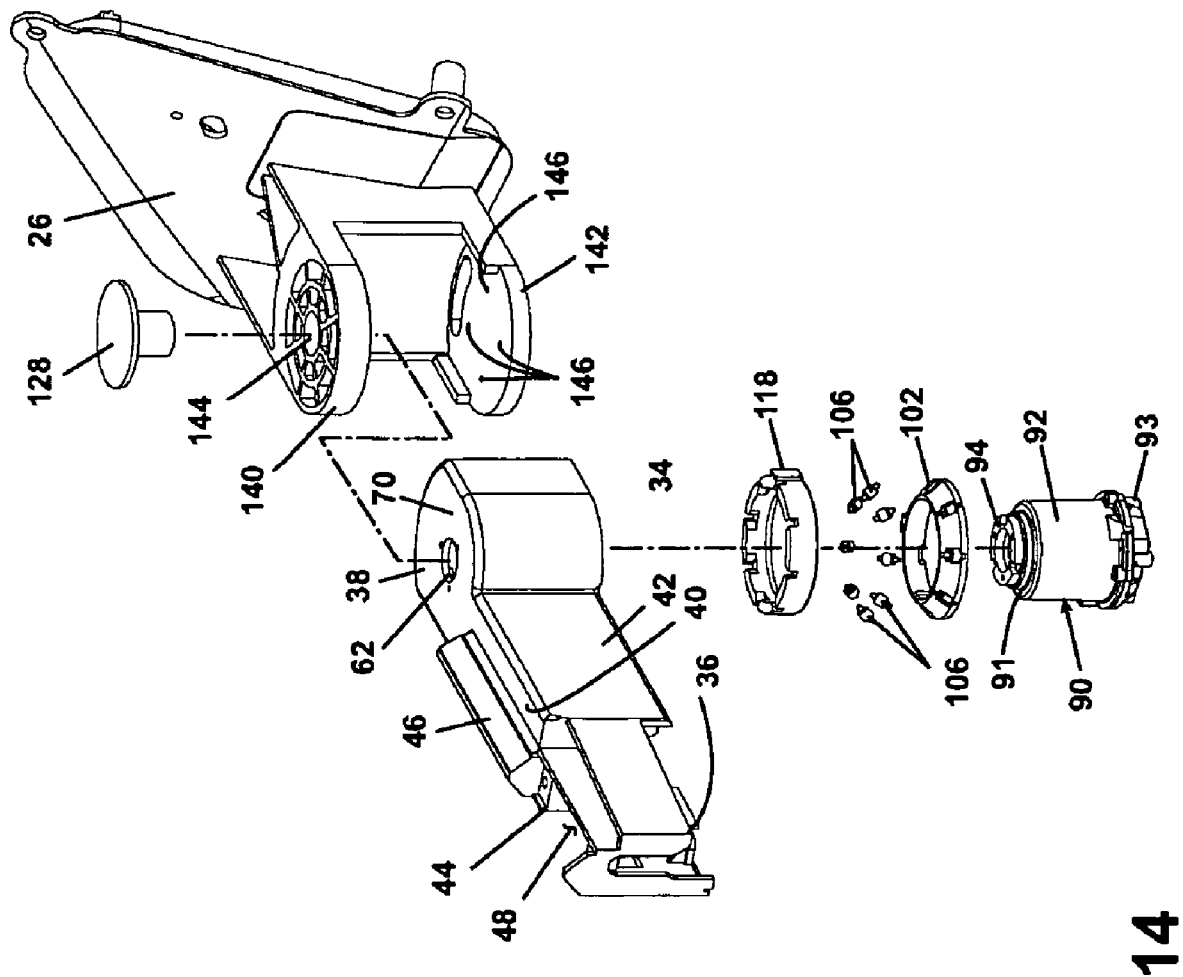
FIG. 14 is a partial exploded view of the support arm and a support base showing a pivot connection according to the invention.

Referring now to FIGS. 5, and 11-13, a pivot actuator 90, as disclosed in U.S. Pat. No. 6,213,609, assigned to the assignee of the current application and incorporated herein by reference, comprises a generally cylindrical, hollow base housing 92, a generally circular base plate 93, and a generally cylindrical, hollow rotating annular shell 94. The base housing 92 comprises an annular shoulder 91 at an upper portion thereof, and is adapted to slidably communicate with the annular shell 94, as shown in FIG. 13. The base portion 92 is also provided at a lower circumferential portion thereof with a ring boss 114. The base plate 93 is provided with a plurality of mounting apertures (not shown) for mounting the base plate 93 to the base frame 26. The base housing 92 and the base plate 93 are adapted for mating cooperation and are fixedly connected, such as by a snap-fit mechanism, welding, or threaded or pin-type fasteners (not shown), to form a chamber 136 for enclosing the rotating annular shell 94.

The rotating annular shell 94 comprises an annular shoulder 99 at an intermediate portion thereof, and terminates in an annular upper wall 88 provided with a plurality of regularly-spaced mounting apertures 96 therethrough. The upper wall 88 is castellated with a plurality of regularly-spaced slots 98, and comprises a pin aperture 100 extending coaxially therethrough. As shown in FIG. 13, the rotating annular shell 94 is slidably retained in the chamber 136, and encloses a drive motor 134 for rotating the rotating shell 94 relative to the base portion 92.

An annular ramp 89 comprises an annular ring-like body adapted for slidable communication with the upper exterior of the rotating shell 94 and the upper interior of the base housing 92. A helical spring 87, such as a well-known wave spring, is adapted to encircle the upper exterior of the rotating shell 94 between the annular shoulder 99 and the annular ramp 89, as shown in FIG. 13.

A frictionless bearing assembly is illustrated as comprising a roller bearing assembly 101, which comprises a ring race 102 and a ring block 118. The ring race 102 is an annular body comprising a circumferential conical face 108 and an annular face 110 defining a truncated cone. The conical face 108 is provided with a plurality of regularly-spaced roller bearing seats 104 adapted to seat a plurality of conventional roller bearings 106. The annular face 110 defines a base aperture 113 adapted to slidably receive the base portion 92 therethrough, and is provided with at least one inner slot 112 adapted to slidably communicate with the ring boss 114 to prevent rotation of the ring race 102 relative to the base portion 92. In the preferred embodiment, the roller bearings 106 are fabricated of high-strength structural plastic having a high surface hardness, such as nylon, polyester, or PBT. It will be evident to a person of ordinary skill in the art that a ball bearing assembly can be utilized as an alternate frictionless bearing in place of the roller bearing assembly described herein.

The ring block 118 comprises an annular body having an inner annular wall 120 defining a base aperture 125 and transitioning to a conical face 124 at a lower portion thereof. The upper portion of the ring block 118 is castellated to define a plurality of regularly-spaced radial slots 122. The base aperture 125 is adapted to be slidably received over the annular wall 68 of the extension arm 34. The conical face 124 is adapted for cooperative juxtaposition with the conical face 108 and contact with the roller bearings 106. The radial slots 122 are adapted to slidably communicate with the radial ribs 74 so that the ring block 118 is urged to rotate with the extension arm 34.

Referring again to FIGS. 7, 12, and 13, the pivot actuator 90 is assembled to the extension arm 34 by inserting the ring block 118 into the pivot end 38 of the extension arm 34 so that the ring block 118 encircles the annular wall 68 and the radial ribs 74 are received within the radial slots 122. The pivot actuator 90 with the ring race 102 slidably received thereover is inserted into the pivot actuator chamber 76 so that the upper surface 88 is brought into proximity to the top wall 70, the mounting apertures 96 are aligned with the mounting apertures 72, and the bosses 86 are received in the slots 98. The ring race 102 will be positioned toward the ring block 118 so that the roller bearings 106 will contact the conical face 124. The pivot actuator 90 and the extension arm 34 are adapted so that a slight gap 123 between the top wall 70 and the upper wall 88 will remain when the pivot actuator 90 is inserted into the pivot actuator chamber 76. The pivot actuator 90 is then secured to the extension arm 34 preferably by suitable threaded fasteners 97 threaded into the apertures 72, 96. As the fasteners 97 are tightened, the upper wall 88 will be drawn toward the top wall 70, thereby closing the gap 123 and drawing the shoulder 99 toward the shoulder 91 against the force of the spring 87. The roller bearings 106 will be pressed into contact with the conical face 124 against the force of the spring 87, which will tend to coaxially align the ring race 102 with the ring block 118. The extension arm 34 can then rotate with the rotating ring 94 relative to the base portion 92.

Referring to FIGS. 3, 5, 11, 12, and 14, a pivot pin 126 comprises a circular top flange 128 in coaxial alignment with a cylindrical shaft 130 rigidly attached thereto. The base frame 26 comprises a plate-like extension arm flange 140 and a plate-like pivot actuator support flange 142 in parallel, spaced-apart juxtaposition for slidable insertion of the pivot end 38 of the extension arm 34 therebetween. The extension arm flange 140 is provided with a pivot aperture 144 coaxially therethrough. The pivot actuator support flange 142 is provided with a plurality of mounting apertures 146 therethrough adapted for cooperative alignment with mating apertures (not shown) in the base portion 92 of the pivot actuator 90. The pivot actuator 90 is attached to the pivot actuator support flange 142 through suitable fasteners, such as threaded screws, inserted through the mounting apertures 146 into mating apertures (not shown) in the base portion 92. As so assembled, the pin aperture 62 in the extension arm 34, the pivot aperture 144 in the extension arm flange 140, and the pin aperture 100 in the rotating ring 94 will be coaxially aligned, as shown in FIG. 13. The cylindrical shaft 130 of the pivot pin 126 is adapted for an interference fit in the pivot aperture 144 and a slidable fit in the apertures 62, 100 so that the pin will be retained in the pivot aperture 144 and will accommodate the rotation of the extension arm 34 and the rotating ring 94.

The use of the frictionless ball bearing assemblies 51, 57 between the extension arm 34 and the mounting frame 22 enable the extension arm 34 and the mounting frame 22 to be tightly fit together while providing for slidable movement between the two parts. The enhanced slidability between the extension arm 34 and the mounting frame 22 enables a smaller, lighter extension actuator to be used. The close fit between the two parts reduces the potential for unwanted relative movement.

Similarly, the use of the frictionless roller bearing assembly 101 in the pivot assembly 20 enables a tight fit between the extension arm 34 and the base frame 26, while enabling unrestricted pivoting of the extension arm 34. The enhanced pivotability between the extension arm 34 and the base frame 26 enables a smaller, lighter pivot actuator to be used. The close fit between the two parts increases the strength of the pivot assembly 20 even when the mirror is fully extended, reduces the development of a precession-type movement of the pivot end 38 relative to the base frame 26, and reduces the potential for unwanted relative movement of the extension arm 34 as a result of torsional forces as well as static and dynamic loading. The use of the extension arm flange 140 in the pivot assembly 20 with the pivot pin 126 securing the extension arm 34 to the base frame 26 also strengthens the pivot assembly 20 and reduces the potential for unwanted relative movement between the extension arm 34 and the base frame 26. The use of the ball bearing assemblies 51, 57 also enables the use of closer tolerance components.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The invention claimed is:

1. A vehicular rearview mirror assembly, comprising:
a base assembly comprising a base frame for mounting the rearview mirror assembly to a vehicle and comprising parallel spaced-apart flanges;
at least one support arm for supporting a reflective element assembly, said at least one support arm moveably connected to the base frame through a pivot connection for selectively folding the reflective element assembly against the vehicle, said reflective element assembly moveably attached to the support arm for extending the reflective element assembly away from the vehicle; and
a plurality of low friction bearings interposed between the reflective element assembly and the at least one support arm for facilitating movement of the reflective element assembly relative to the vehicle;
wherein the at least one support arm is interposed between the parallel flanges to form the pivot connection.

2. A rearview mirror assembly according to claim 1, wherein the plurality of low friction bearings comprises a ball bearing.

3. A rearview mirror assembly according to claim 1, wherein the plurality of low friction bearings comprises a roller bearing.

4. A rearview mirror assembly according to claim 1, wherein the plurality of low friction bearings is interposed between the at least one arm and the parallel flanges.

5. A rearview mirror assembly according to claim 4, wherein the plurality of low friction bearings comprises a ball bearing.

6. A rearview mirror assembly according to claim 4, wherein the plurality of low friction bearings comprises a roller bearing.

7. A vehicular rearview mirror assembly, comprising:
a base assembly adapted for mounting the rearview mirror assembly to a vehicle and comprising parallel spaced-apart flanges, said base assembly moveably connected to an extension arm through a pivot connection;
a reflective element disposed in a reflective element assembly, said reflective element assembly attaching to the extension arm and moveable along the extension arm for providing an operator of the vehicle with a rearward view when the vehicle is towing a trailer; and
wherein the reflective element assembly is slidably movable along the extension arm via a plurality of low friction bearings interposed between the extension arm and the reflective element assembly for facilitating movement of the reflective element assembly relative to the extension arm;
said plurality of low friction bearings comprising at least one of a ball bearing and a roller bearing.

8. A rearview mirror assembly according to claim 7, wherein the reflective element assembly further comprises a mounting frame and the plurality of low friction bearings is interposed between the extension arm and the mounting frame for facilitating the movement of the mounting frame relative to the base assembly.

9. A rearview mirror assembly according to claim 7, wherein the extension arm is connected to the base assembly by a moveable connection.

10. A rearview mirror assembly according to claim 9, wherein the plurality of low friction bearings comprises a ball bearing.

11. A rearview mirror assembly according to claim 9, wherein the plurality of low friction bearings comprises a roller bearing.

12. A rearview mirror assembly according to claim 7, wherein the plurality of low friction bearings is interposed between the extension arm and the parallel flanges.

13. A rearview mirror assembly according to claim 12, wherein the plurality of low friction bearings comprises a ball bearing.

14. A rearview mirror assembly according to claim 12, wherein the plurality of low friction bearings comprises a roller bearing.

* * * * *